(12) United States Patent
Spears et al.

(10) Patent No.: US 11,883,842 B2
(45) Date of Patent: Jan. 30, 2024

(54) ADHESIVE COMPOSITIONS AND METHODS FOR COATING OBJECTS

(71) Applicants: Polynt Composites USA, Inc., Carpentersville, IL (US); Tru-Design, LLC, Knoxville, TN (US)

(72) Inventors: Richard Earl Spears, Clinton, TN (US); Robert Springfield, Livingston, TX (US); Murray Akerman, Bewdley (CA); Alain Laframboise, Saint-Germain-de-Grantham (CA); Michael Allen Mathews, Glenview, IL (US); Richard Joseph Pauer, Saint Charles, IL (US); Steven L. Voeks, Smithville, MO (US)

(73) Assignees: Polynt Composites USA, Inc., Carpentersville, IL (US); Tru-Design, LLC, Knoxville, TN (US)

( * ) Notice: Subject to any disclaimer, the term of this patent is extended or adjusted under 35 U.S.C. 154(b) by 374 days.

(21) Appl. No.: 15/488,251

(22) Filed: Apr. 14, 2017

(65) Prior Publication Data
US 2018/0298246 A1    Oct. 18, 2018

(51) Int. Cl.
*B05D 3/00* (2006.01)
*C08L 31/02* (2006.01)
(Continued)

(52) U.S. Cl.
CPC .......... *B05D 3/007* (2013.01); *C08F 283/006* (2013.01); *C08F 285/00* (2013.01); *C08G 18/672* (2013.01); *C08G 18/73* (2013.01); *C08G 18/755* (2013.01); *C08G 18/7621* (2013.01); *C08G 18/7671* (2013.01); *C08L 31/02* (2013.01); *C08L 67/06* (2013.01); *C08L 75/16* (2013.01); *C09D 175/16* (2013.01); *C09J 7/30* (2018.01); *C09J 151/04* (2013.01);
(Continued)

(58) Field of Classification Search
None
See application file for complete search history.

(56) References Cited

U.S. PATENT DOCUMENTS

| 4,485,226 A | 11/1984 | Noll et al. |
| 4,507,458 A | 3/1985 | Shiraki et al. |

(Continued)

FOREIGN PATENT DOCUMENTS

| CN | 103038299 | 4/2013 |
| CN | 105038514 | 11/2015 |

(Continued)

OTHER PUBLICATIONS

Klm—rapid prototyping comparison—Proc.IMechE Part B J.Eng. Manu.—surface profiles—Sep. 2007 (Year: 2007).*

(Continued)

*Primary Examiner* — John Vincent Lawler
(74) *Attorney, Agent, or Firm* — Neal, Gerber & Eisenberg LLP (57) ABSTRACT

An adhesive composition comprising a core shell vinyl ester and a urethane acrylate, which is suitable to be applied to a rough or uneven surface of a substrate to render a smooth surface. The present adhesive composition is particularly suitable to coat large objects made through additive manufacturing to form molds or prototypes.

11 Claims, 1 Drawing Sheet

(51) Int. Cl.
| | |
|---|---|
| *C08L 75/16* | (2006.01) |
| *C08L 67/06* | (2006.01) |
| *C09J 175/16* | (2006.01) |
| *C08G 18/67* | (2006.01) |
| *C09J 7/30* | (2018.01) |
| *C08G 18/75* | (2006.01) |
| *C08G 18/76* | (2006.01) |
| *C09D 175/16* | (2006.01) |
| *C08G 18/73* | (2006.01) |
| *C09J 151/04* | (2006.01) |
| *C08F 283/00* | (2006.01) |
| *C08F 285/00* | (2006.01) |
| *B05D 1/02* | (2006.01) |
| *B05D 3/12* | (2006.01) |
| *B05D 5/10* | (2006.01) |

(52) U.S. Cl.
CPC .............. *C09J 175/16* (2013.01); *B05D 1/02* (2013.01); *B05D 3/12* (2013.01); *B05D 5/10* (2013.01); *C08L 2205/025* (2013.01); *C08L 2207/53* (2013.01); *C09J 2467/00* (2013.01); *C09J 2475/00* (2013.01)

(56) References Cited

U.S. PATENT DOCUMENTS

| | | | | |
|---|---|---|---|---|
| 4,948,822 | A * | 8/1990 | Iovine | C08F 265/04 523/201 |
| 7,307,123 | B2 * | 12/2007 | Johnson | G03F 7/032 428/515 |
| 8,182,882 | B2 | 5/2012 | Johnson et al. | |
| 10,590,299 | B2 | 3/2020 | Tasaka et al. | |
| 2002/0010274 | A1 * | 1/2002 | Waid | C09J 163/00 525/113 |
| 2003/0196753 | A1 | 10/2003 | Schoenfeld et al. | |
| 2006/0292378 | A1 * | 12/2006 | Mgaya | B32B 7/12 428/423.1 |
| 2007/0195431 | A1 * | 8/2007 | Asakura | G02B 1/111 359/707 |
| 2008/0188609 | A1 | 8/2008 | Agarwal et al. | |
| 2012/0142863 | A1 | 6/2012 | Miyamoto | |
| 2012/0261071 | A1 * | 10/2012 | Barker | C08G 18/4854 156/331.7 |
| 2012/0302695 | A1 * | 11/2012 | Osae | C09J 175/14 524/504 |
| 2014/0275423 | A1 | 9/2014 | Lutz et al. | |
| 2014/0364530 | A1 * | 12/2014 | Lindekens | C08G 63/47 522/8 |
| 2015/0273766 | A1 | 10/2015 | Denda et al. | |

FOREIGN PATENT DOCUMENTS

| | | | |
|---|---|---|---|
| JP | 2004051665 | 2/2004 | |
| JP | 2006002110 | 1/2006 | |
| JP | 2016024240 | 2/2016 | |
| JP | 2016/079263 | * 5/2016 | ............ B32B 27/00 |
| WO | WO1997043339 | 11/1997 | |
| WO | WO2010143366 | 12/2010 | |
| WO | WO2017044381 | 3/2017 | |

OTHER PUBLICATIONS

Kuo—method for improving surface quality of rapid prototype—Ind.J.Eng.Mat.Sci.—2013 (Year: 2013).*
Hofmann—3D Printing of polymers—ACS Macro Letters—2014 (Year: 2014).*
Turner—melt extrusion additive manu.fact.—roughness—Rapid Proto. J.—2015 (Year: 2015).*
Hayashi—JP 2016-079263 A—MT—anisotropic adhesive sheet over profiled surface—2016 (Year: 2016).*
Gryshchuk—acrylate+urethane+rubber+amounts—J.Appl.Poly.Sci.—2002 (Year: 2002).*
Reichhold DION 9800—urethane-modified vinyl ester resin—2003 (Year: 2003).*
Reichhold DION 9500—rubber modified vinyl ester resin—2006 (Year: 2006).*
International Search Report and Written Opinion for PCT/US2017/027746 dated Jul. 21, 2017.
Valimaki, "3D Printing Materials Breakdown: ABS vs PLA," Elsevier, posted to https://chemical-materials.elsevier.com/author/christina/ on Oct. 29, 2015.
Sudbury, et al., "An assessment of additive manufactured molds for hand-laid fiber reinforced composites," International Journal of Advanced Manufacturing Technology, vol. 90, pp. 1659-1664, May 2017.
Extended Supplementary Search Report for European Patent Application No. 17905641.1 dated Oct. 23, 2020, 10 pp.
Yee, et al., "Toughening mechanisms in elastomer-modified epoxies," Journal of Materials Science 21, 1986, 13 pp.

* cited by examiner

ADHESIVE COMPOSITIONS AND METHODS FOR COATING OBJECTS

JOINT RESEARCH AGREEMENT

Aspects of the present invention were made by or on behalf of the below listed parties to a joint research agreement. The joint research agreement was in effect on or before the date aspects of the present invention were made and aspects of the present invention were made as a result of the activities undertaken within the scope of the joint research agreement. The parties to the joint research agreement are Polynt Composites USA Inc., Polynt Composites Canada Inc., and Tru-Design, LLC.

BACKGROUND

This application relates generally to an adhesive composition useful as a coating or sealant for objects. In particular, the present composition is useful as a coating or sealant for objects with a rough or uneven surface, such as objects made by additive manufacturing.

Additive manufacturing, also known as three-dimensional printing, has grown in popularity and is now used in a wide array of industries for the manufacturing of objects. However, objects made via additive manufacturing have a rough surface and, consequently, are not suitable for use in many intended applications, for example, as molds or prototypes. Therefore, a need exists for an improved composition and method to improve the surface of objects made via additive manufacturing.

Prior attempts to address the rough surface of these objects included grinding the object to create a smooth surface and then painting the object to render the final product. However, grinding the object is very time consuming, creates a great deal of dust which is often problematic due to its content of carbon or other fibers, and limits the usefulness of the additive manufacturing process for real world applications. Moreover, paint failures are common due to inability of paint to withstand the expansion and contraction of the object.

Existing coating compositions for objects made via additive manufacturing, particularly large objects, often lack sufficient adhesion to the common substrates, such as acrylonitrile butadiene styrene (ABS), polyphenylene sulfide (PPS), and others. Further, existing coating compositions fail due to expansion and/or contraction of the substrate under various conditions. Thus, a need exists for a coating composition that can sufficiently adhere to the common substrates and renders an object with a smooth surface.

Large objects made by additive manufacturing have a number of other technical challenges, which are detailed in part by Sudbury et al., Int J Adv Manuf Technol. (29 Sep. 2016), which is hereby incorporated by reference in its entirety. These challenges include, but are not limited to pooling of paint or adhesive sealant and cracking of the same. Therefore, a need exists for a coating composition that can overcome the known issues associated with large objects made by additive manufacturing.

Objects made by additive manufacturing finished by known compositions and methods suffer from a lack of durability. Molds made of traditional materials can withstand pulls greater than 10, greater than 50, or greater than 100. However, molds comprising objects made by additive manufacturing can only withstand pulls less than 5 or less than 10. Therefore, a need exists for a coating composition that can withstand mechanical forces associated with the standard use of molds.

Objects made by additive manufacturing can undergo further processing to add parts onto the objects. These objects are subjected to autoclave under vacuum. Prior art compositions have failed to withstand the temperature and pressure changes associated with autoclaving under vacuum. Therefore, a need exists for a coating composition that can withstand temperature and pressure changes associated with finishing objects made by additive manufacturing.

SUMMARY

The present disclosure relates to a composition comprising a core shell vinyl ester resin and a urethane acrylate. The core shell vinyl ester resin may comprise 25 to 95% of the total weight of the composition and/or contain core shell polymer with an average diameter of 50 to 350 nm. The urethane acrylate may comprise 2 to 25% of the total weight of the composition.

The present composition may optionally further comprise a monomer, one or more additives, and/or one or more unsaturated polyester resins. A particularly suitable monomer is styrene or a derivative thereof. Suitable additives include a cross-linking agent, curing agent, thixotropic agent, air release/wetting agent, coloring agent, air release, inorganic or organic filler, light weight filler, surfactant, inorganic or organic nanoparticles, or combinations thereof.

The present composition may have a carbamate linkage content of 0.1 to 10%; exhibits a heat deflection temperature greater than 140° F.; and/or the composition can elongate greater than 5%.

The present disclosure further relates to a polymer composite article, preferably produced by additive manufacturing, comprising a polymer body having a surface and an adhesive coating comprising core shell vinyl ester resin or the present composition of core shell vinyl ester resin and urethane acrylate. The polymer composite article is made from a substrate where the substrate type may be acrylonitrile butadiene styrene, polyphenylene sulfide, polypenylsulfone, polyethersulfone, polyethylene terephthalate, polybutylene terephthalate, polylactic acid, or combinations thereof. These substrate types may be reinforced with materials including, but not limited to glass fibers, carbon fibers, bamboo, or combinations thereof.

When the adhesive coating is applied to the polymer composite article, it may be applied in a manner such that the composition has an average thickness of greater than 0.08 inches on the surface of the substrate. Once cured, the adhesive coating (1) adheres to the surface of the substrate; (2) the bond strength between the adhesive coating and the surface of the substrate is greater than 300 psi; and/or (3) the adhesive coating, after it is cured, may have a finished surface profile of less than 0.10 mm.

The present disclosure still further relates to a method of using the present composition to manufacture a polymer composite article, such as a mold or prototype, comprising (a) forming a substrate comprising a polymer body having a surface; (b) applying an adhesive coating on the surface of the polymer body, wherein the adhesive coating comprises core shell vinyl ester resin; and (c) curing the adhesive coating applied in (b). The applying step can be accomplished through use of a squeegee, roller, trowel, spatula, paint stick, paint brush, or other mechanical means. Alternatively, the applying step could be accomplished through use of a sprayer to spray the composition onto the object.

The result of the applying step may be a layer of adhesive coating with a thickness greater than 0.08 inches to achieve the desired properties.

In some cases, multiple applications of the adhesive coating is warranted. In these cases, the prior application of the adhesive coating should cool to within 10° F. of the initial temperature of the surface of the substrate. Then an additional application of the adhesive coating can be made onto the prior application of adhesive coating and be allowed to cure.

BRIEF DESCRIPTION OF THE DRAWING

The present disclosure can be better understood from the following detailed description when read with the accompanying drawing FIGURE. The features are not necessarily drawn to scale.

DETAILED DESCRIPTION

The present adhesive composition can be used as an adhesive composition that functions to fill voids of objects having a rough or uneven surface present on certain substrates. The present adhesive composition can further be used as a sealant capable of withstanding temperature and pressure changes common to objects comprising certain substrates. Both objects may be created by an additive manufacturing process.

A composition and methods of use disclosed herein are designed for use with objects with a rough or uneven surface. As used herein, an "object" includes an article of manufacture, preferably a polymer composite article, and more preferably a polymer composite article made via additive manufacturing, and optimally, a polymer composite article made via large-scale additive manufacturing. In preferred embodiments, the object may be a mold or prototype. The objects may comprise a wide range of polymer substrates, including, but not limited to, acrylonitrile butadiene styrene (ABS), polyphenylene sulfide (PPS), polypenylsulfone (PPSU), polyethersulfone (PES), polyethylene terephthalate, polybutylene terephthalate, polylactic acid (PLA)), and the like. These substrates may be optionally reinforced with glass fibers, carbon fibers, bamboo, or the like, or combinations thereof. One skilled in the art would appreciate other similar substrates could be used with the present composition.

In embodiments, the present composition adheres to substrates with a surface profile in the range of 1.0 to 10 mm; alternatively, 2 to 7.5 mm; or alternatively 2.5 to 5.0 mm.

When the present composition is applied to objects with a rough or uneven surface as an adhesive coating or sealant and allowed to cure, the result is an object that is impervious or substantially impervious to gas or liquid. In other words, the use of the present composition inhibits the entry of gas or liquid into the substrate of the object.

The present composition when used as an adhesive coating or sealant has been shown to withstand standard and experimental thermal cycling without showing the underlying defects within the substrate surface or losing vacuum seal. Without being bound by any particular theory, it is believed that the ability to withstand these thermal changes without deformation is at least partially attributable to the elongation properties of the present composition.

In embodiments, the present composition when used as an adhesive coating or sealant also functions to fill all print defects common in objects made via additive manufacturing. A non-limiting list of common defects includes voids, geometric imperfections, missing or broken beads, under-fill cavities and surface contour/texture/resolution issues. As a result of this function, the use of the present composition results in objects with a smooth surface receptive to final finishing (e.g., painting). Such objects are ideal for use as molds or prototypes.

The present composition comprises a core shell vinyl ester resin and a urethane acrylate. As used herein, a "core shell vinyl ester resin" means a vinyl ester resin and a core shell polymer, wherein a core shell polymer is dispersed throughout the vinyl ester resin. One exemplary vinyl ester is disclosed in WO1997/043339, which is hereby incorporated by reference in its entirety. Such resins have also been referred to as "toughened vinyl ester resins." The most widely known and used vinyl ester resin is produced from the diglycidyl ether of bisphenol-A (DGEBA) and methacrylic acid. Typically, an amine salt or triphenylphosphine is used to catalyze the reaction at a temperature of about 120° C. for 4 to 5 hours. 90 to 95% of the methacrylic acid reacts to form the vinyl ester. Styrene may be added to reduce the viscosity during synthesis. Alternatively, glycidyl methacrylate may be reacted with a multifunctional phenol to form a vinyl ester resin.

Core shell polymers, which are dispersed in vinyl ester resins in accordance with the present disclosure, are generally produced by controlled emulsion polymerization during which the composition of the monomer feed is changed in order to achieve a desired compositional variation over the structure of the core shell polymer. While many core shell polymers having a variety of properties are available, the core shell polymers suitable for use in the present composition typically have a core which is rubbery at ambient conditions and is produced by polymerizing such monomers as butadiene and alkyl acrylates. By "rubbery at ambient conditions" it will be understood that the core of the core shell polymer has a Tg which is lower than the ambient temperature. Preferred core shell polymers include, but are not limited to, polymerized versions of: butadiene; butadiene and styrene; butadiene, methyl methacrylate and styrene; butadiene, alkyl methacrylate, and alkyl acrylate; butadiene, styrene, alkyl acrylate, alkyl methacrylate and methacrylic acid; butadiene, styrene, alkyl acrylate, alkyl methacrylate, methacrylic acid and low molecular weight polyethylene (as flow modifier); butyl acrylate and methyl methacrylate; alkyl methacrylate, butadiene and styrene; alkyl acrylate, alkyl methacrylate and glycidylmethacrylate; and alkylacrylate and alkylmethacrylate. The core shell polymer may comprise an average diameter of 50 to 350 nm; alternatively, 100 to 300 nm; alternatively, 150 to 250 nm; alternatively, about 200 nm; or alternatively, 200 nm. Particularly preferred core shell polymers for use in the present composition are core shell polymers which incorporate butadiene as a core component. A preferred shell component is poly(methyl methacrylate) (PMMA). The core shell polymer may be amine terminated butadiene nitrile rubber (ATBN) nanoparticles. One suitable core shell polymer is polybutadiene core with poly(methyl methacrylate co-styrene) shell. The core shell polymer may be optionally disposed within a carrier resin. The carrier resin may be a general purpose bisphenol epoxy resin or derivatives thereof known to those skilled in the art. For example, a preferred carrier resin is a diglycidyl ether of bisphenol A and extended versions thereof. The carrier resin may be a diepoxy resin, for example Novalac.

In embodiments, the core shell vinyl ester resin comprises about 25 to about 95%; alternatively, 25 to 95%; alternatively, 50 to 95%; alternatively, 60 to 95%; or alternatively 75 to 95% of the total weight of present composition.

As used herein, "urethane acrylate" means a reaction product of diisocyanate, a —OH functional molecule with olefinic double bond, and optional mono-, di-, or multifunctional —OH containing material. One exemplary urethane acrylate for use in the present composition is disclosed in U.S. Pat. Nos. 4,485,226 and 4,507,458, which are hereby incorporated by reference in its entirety. As used herein "diisocyanates" means any type of aromatic, aliphatic, alicyclic and aromatic-aliphatic polyisocyanates, two or more isocyanate groups on each molecule; including dimers and trimers. Exemplary aromatic polyisocyanates include diphenylmethane diisocyanate (MDI) and toluene diisocyanate (TDI). Exemplary aliphatic polyisocyanates include hexamethylene diisocyanate (HDI) and isophorone diisocyanate (IPDI). The "—OH functional molecule with olefinic double bond" may include partial esters of polyhydric alcohols with acrylic acid or methacrylic acid, such as, for example, ethylene glycol monoacrylate or monomethylacrylate, 1,2- or 1,3-propanediol monoacrylate or monomethylacrylate, 1,4-butanediol monoacrylate or monomethyacrylate, 1,6-hexanediol monoacrylate or monomethacrylate, trimethylolpropane diacrylate, glycerol diacrylate, pentaertythritol triacrylate and the mono(N-methylolacrylamide)-ethers and mono-(N-methylolmethacrylamide)-ethers of ethylene glycol, propylene glycol, butanediol, hexanediol and neopentyl glycol. The "mono, di, or multifunctional OH containing material" may include polyfunctional alcohols, such as diols of 2 to 8 carbon atoms, for example ethylene glycol, propanediols, butanediols, pentanediols, hexanediols, triols, such as, for example, glycerol, trimethylolpropane and hexanetriols, pentaertythritol and the like; or polyetherpolyols prepared by reaction of 1 molecule of alcohol with from 1 to 50, preferably 15 to 30 molecules, molecules of ethylene oxide or propylene oxide. Polyester polyols can include the reaction product of polycondensation of polybasic acids, such as adipic acid, succinic acid, azelaic acid, sebacic acid, phthalic acid, isophthalic acid and terephthalic acid, with polyhydric alcohols, such as 1,4-butanediol, 1,3-butanediol, ethylene glycol, diethylene glycol, propylene glycol, 1,2-propylene glycol, dipropylene glycol, 1,6-hexaneglycol and neopentyl glycol.

In embodiments, the urethane acrylate has one or more of the following attributes: a carbamate linkage content of 0.1 to 10%, alternatively, 0.5 to 5%, alternatively, 0.5 to 4%, or alternatively, 0.5 to 3%; a nominal molecular weight of 600 to 5000, preferably 1500 to 3000; viscosity of about 4000 cps @ 60° C.

In embodiments, the urethane acrylate comprises about 2 to about 25%; alternatively, 2 to 25%; or alternatively 5 to 20% of the total weight of the present composition.

The present composition may further comprise one or more additives selected from an air release/wetting agent, rheology modifier, thixotropic synergist, inhibitor, initiator, catalyst, surfactant, filler, and paraffin wax. The present composition may comprise more than one additive of the same type (e.g., one or more fillers) or a combination of additives of different types (e.g., at least one catalyst and at least one surfactant).

When present, the one or more additives may comprise about 0.1 to about 40%; alternatively 0.1 to 40%; alternatively, 0.1 to 20%; or alternatively, 0.1 to 15% of the total weight of the present composition.

The present composition may further comprise a monomer. Exemplary monomers include, but are not limited to styrene, methyl methacrylate, vinyl toluene, hydroxy methyl methacrylate, hydroxy methyl acrylate, hydroxy ethyl methacrylate, hydroxy ethyl acrylate, hydroxy propyl acrylate, hydroxy propyl methacrylate, alpha methyl styrene, and divinyl benzene. Further exemplary monomers include o-methyl styrene, m-methyl styrene, p-methyl styrene, methyl acrylate, t-butylstyrene, diallyl phthalate, triallyl cyanurate, tri methylolpropane triacrylate, tri methylolpropane tri methacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol dimeacrylate; butanediol diacrylate; butane-diol dimethacrylate; pentaerythlitol triacrylate; pentaerythritol tetra-acrylate; ethoxylated bisphenol A diacrylate; hexane diol diacrylate; dipentaerythritol monohydroxypentaacrylate; neopentyl glycol diacrylate; neopentyl glycol dimethacrylate; and tris(2-hydroxyethyl)isocyanurate triacrylate. In preferred embodiments, the monomer is styrene or one of its derivatives.

The monomer may comprise 0.1 to about 40%; alternatively, 0.1 to 40%; alternatively, 0.1 to 30%; or alternatively 0.1 to 20% of the total weight of the present composition.

The present composition may comprise a multi-part composition where each part is prepared separately and then combined to arrive at the present composition. In these embodiments, the present composition comprises a first part comprising the core shell vinyl ester resin; and a second part comprising a urethane acrylate. The present composition may optionally further comprise a third part comprising a monomer as described herein.

The first part may comprise about 25 to about 95%; alternatively, 25 to 95%; alternatively, 30 to 95%; alternatively, 50 to 90%; alternatively, 55 to 85%; alternatively, 60 to 80%; alternatively, 65 to 75%; or alternatively, 70 to 75% of the total weight of the present composition.

The second part may comprise about 2 to about 25%; alternatively, 2 to 25%; alternatively, 5 to 20%; alternatively, 5 to 15%; or alternatively, 10 to 15% of the total weight of the present composition.

The third part may comprise about 1 to about 75%; alternatively, 1 to 75%; alternatively, 2 to 40%; alternatively, 10 to 30%; alternatively, 10 to 20%; or alternatively, 15 to 20% of the total weight of the present composition.

The first part may comprise a core shell vinyl ester resin described herein. The first part may comprise a reaction product of an epoxy resin and a methacrylic acid or derivative thereof, wherein the core shell polymers are disbursed in the epoxy resin. The epoxy resin may comprise a bisphenol A/epichlorohydrin derived liquid epoxy resin. For example, one suitable bisphenol A/epichlorohydrin derived liquid epoxy resin is D.E.R.™ 331 available from Dow (Midland, MI 48674). Another suitable bisphenol A/epichlorohydrin derived liquid epoxy resin is EPON™ Resin 828 available from Hexion Specialty Chemicals (Columbus, OH 43215). In embodiments, the bisphenol A/epichlorohydrin derived liquid epoxy resin is a resin with an epoxide equivalent weight (g/eq) ranging from 185-192, a viscosity at 25° C. of 110 to 150 P, a density at 25° C. of 9.7 lbs/gal, a vapor pressure at 77° C. of about 0.03 mm Hg, a refractive index at 25° C. of about 1.5, and/or a specific heat of about 0.5 BTU/lb/° F. In embodiments, the bisphenol A/epichlorohydrin derived liquid epoxy resin is a resin with an epoxide equivalent weight (g/eq) ranging from 182-192, an epoxide percentage ranging from 22.4 to 23.6%, an epoxide group content ranging from 5200 to 5500, a viscosity ranging from 11000 to 14000 mPa-s, and/or a density at 25° C. of about 1.16 g/ml. In preferred embodiments, the epoxy resin is a mixture of two or more bisphenol A/epichlorohydrin derived liquid epoxy resin described herein.

The epoxy resin may comprise about 10 to about 55%; alternatively, 10 to 40%; alternatively, 15 to 35%; alternatively, 20 to 30%; or alternatively, 25 to 30% of the total weight of the first part.

The resultant core shell vinyl ester resin of the first part may comprise about 60 to about 95%; alternatively, 60 to 95%; alternatively, 65 to 95%; alternatively, 70 to 95%; or alternatively, 75 to 95% of the total weight of the first part.

In embodiments, the first part may further comprise a monomer described herein, which may comprise about 10 to about 80%; alternatively, 10 to 70%; alternatively, 20 to 40%; or alternatively, 25 to 35% of the total weight of the first part. In preferred embodiments, the monomer is styrene or one of its derivatives.

The first part may further comprise one or more additives. Particularly suitable additives are stabilizers that facilitate shelf life or stability of the first part and/or ultimately the total present composition. One suitable additive for the first part is hydroquinone available from Sigma-Aldrich Co., LLC (St. Louis, MO 63103). When present, hydroquinone comprises less than 1%; alternatively, less than 0.05%; alternatively, 0.01 to 0.05%; alternatively, about 0.03%; or alternatively, 0.03% of the total weight of the first part. Another suitable additive for the first part is 4-methoxyphenol available from Sigma-Aldrich Co., LLC (St. Louis, MO 63103). When present, 4-methoxyphenol comprises less than 0.1%; alternatively, less than 0.05%; alternatively, 0.001 to 0.015%; alternatively, about 0.01%; or alternatively, 0.01% of the total weight of the first part. Another suitable additive for the first part is p-benzoquinone available from Sigma-Aldrich Co., LLC (St. Louis, MO 63103). When present p-benzoquinone comprises less than 1%; alternatively, less than 0.5%; alternatively, 0.2 to 0.4% of the total weight of the first part. Another suitable additive for the first part is maleic anhydride available from Sigma-Aldrich Co., LLC (St. Louis, MO 63103). When present, maleic anhydride comprises less than 1%; alternatively, 0.2 to 0.6%; alternatively, 0.3 to 0.5% of the total weight of the first part. Another suitable additive for the first part is 2-hydroxyethylmethacrylate available from Sigma-Aldrich Co., LLC (St. Louis, MO 63103). When present, 2-hydroxyethylmethacrylate comprises about 1 to about 10%; alternatively, 1 to 10%; alternatively, 2 to 8%; alternatively, 3 to 6%; alternatively, about 5%; or alternatively, 5% wt. percent of the total weight of the first part.

The urethane acrylate may comprise about 40 to about 90%; alternatively, 40 to 90%; alternatively, 50 to 90%; alternatively, 60 to 90%; or alternatively, 70 to 90% of the total weight of the second part.

The second part may further comprise one or more additives. One suitable additive for the second part is methyl hydroquinone. When present the methyl hydroquinone may comprise 100 to 500 ppm; or alternatively, 300 to 400 ppm. A monomer may also be added to the second part. When present, the monomer may comprise 0.5 to 60%; alternatively, 5 to 40%; or alternatively, 10 to 25% of the total weight of the second part.

In one embodiment, the present composition comprises the components listed in Table 1.

TABLE 1

| Component | Weight Percent of Total Composition |
| --- | --- |
| Core shell vinyl ester resin | 25-95% |
| Urethane acrylate | 2-25% |
| Monomer | 0-40% |
| Additives | 0-40% |

The additives noted in Table 1 can be added directly to an individual component as described in the multi-part disclosure or to the total composition. In another embodiment, the present composition may comprise the components listed in Table 2.

TABLE 2

| Component | Weight Percent of Total Composition |
| --- | --- |
| Core shell vinyl ester resin | 75-95% |
| Urethane acrylate | 5-25% |
| Styrene | 0-20% |
| Additives | 0-10% |

The additives noted in Table 2 can be added directly to an individual component as described in the multi-part disclosure or to the total composition.

In yet another embodiment, the present composition may comprise the components listed in Table 3.

TABLE 3

| Component | Amount |
| --- | --- |
| Composition of Table 1 or 2 | 10-99.9% wt. percent of total composition |
| Monomer | 0-90% wt. percent of total composition |
| Air release agent | 0-5% wt. percent of total composition |
| Inhibitor | 10-2000 ppm |
| Catalyst | 0.01-3% wt. percent of total composition |
| Co-catalyst | 0-1% wt. percent of total composition |
| Bridging agent | 0-5% wt. percent of total composition |
| Rheology modifier | 0-5% wt. percent of total composition |
| Filler | 0-80% wt. percent of total composition |
| Coloring Agent | 0-25% wt. percent of total composition |

The core shell vinyl ester resin or first part can be made according to the following procedure. In a clean, dry glass reactor equipped with agitator, dry air sparge and heating mantle, charge the bisphenol A epoxy and core shell polymer dispersed in epoxy and mix. The mixture is then heated to approximately 115° C. Tetramethylammonium chloride and bisphenol A is slowly added holding the temperature between 115 and 120° C. until the epoxy number is stable. Monomer, hydroquinone, and 2,4,6-tri(dimethylaminomethyl)phenol can be added at this point and mixed. Methacrylic acid is then added gradually and mixed over a two hour period holding the temperature at approximately 115° C. until the acid value is stable. The mixture is then cooled to room temperature. Additives as disclosed herein can be added to the cooled mixture to form the first part.

The urethane acrylate or second part can be made according to the following procedure. In a clean glass reactor free of moisture equipped with a dry air sparge and agitator, add toluene diisocyanate and triphenylantimony to the reactor begin agitating. Then start the dry air sparge and add hydroxyethyl acrylate over a two hour period maintaining temperature less than 130° F. The mixture is then held for 30 minutes at 125° F. Methyl hydroquinone is then added and mixed. Then polyol is added gradually over a one hour period at 130° F. When the isocyanate reaction is complete, add 100 ppm methylhydroquinone and monomer and mix. The mixture is then cooled to room temperature. Additives as disclosed herein can be added to the cooled mixture to form the second part.

The present composition may be manufactured using a high shear mixer (for example, a ribbon blender). In embodiments, the core shell vinyl ester resin or first part is added together with the urethane acrylate or second part and mixed together for approximately 3 minutes via a high shear mixer in a temperature range of below 120° F. The monomer or third part and/or one or more additives are then added to the mixture and mixed to achieve the desired physical properties. In preferred embodiments, the first part and second part are added together and mixed for approximately three minutes via a high shear mixer in a temperature range of below 65-85° F. Then monomer and additives can be added to the mix to achieve the optimal physical properties. For example, monomer and additives can be added until the present composition exhibits one or more of the following characteristics: viscosity of 10,000 to 30,000 cPs @ 20 rpm; viscosity of 16,000 to 20,000 cPs @ 20 rpm; thixotropic index greater than 3; thixotropic index greater than 4; gel time of 6 to 10 min at room temperature; a density ranging from 0.50 to 1.0 $g/cm^3$; or a density ranging from 0.70 to 0.80 $g/cm^3$. Particularly suitable additives to achieve these characteristics include an air release/wetting agent, one or more rheology modifiers, thixotropic synergist, one or more inhibitor, one or more initiators, one or more catalysts, one or more surfactants, one or more fillers, paraffin wax.

When present, the air release/wetting agent is selected from polyacrylate, silicone, mineral oil or combinations thereof. When present, the rheology modifier is selected from fumed silica; clay, particularly organo-treated clay; castor oil; polyamides; and combinations thereof. When present, the catalyst is selected from cobalt naphthenate, cobalt octoate, cobalt hydroxide, potassium octoate, potassium naphthanate, manganese salts, iron salts, N,N-dimethyl aniline, N,N-dimethyl-p-toluidine. In preferred embodiments, the present composition uses a combination of two catalysts, otherwise described herein as a catalyst and a co-catalyst. In preferred embodiments, one or more catalysts and co-catalysts are added to the present composition before application for desired curing performance depending on intended use. When present, the inhibitor may be a chemical capable of extending the gel time and/or extend the shelf life of the present composition. Exemplary inhibitors include, but are not limited to, t-butyl catechol, hydroquinone, methyl hydroquinone, monomethyl ether of hydroquinone, copper naphthenate, triphenyl antimony. When present, the filler may be one or more organic fillers, one or more inorganic fillers, or a combination thereof. Exemplary organic fillers include, but are not limited to, low shrink additives, polyethylene, crosslinked polyesters, crosslinked acrylic, crosslinked urethane, abs, graphite, graphene, carbon nanotubes, and carbon fibers. Exemplary low shrink additives include polyvinyl acetate, polystyrene, polyethylene and the like. Exemplary inorganic fillers include, but are not limited to, calcium carbonate, clay, talc, wollastonite, fly ash, glass microballoons, zinc sulfate, nano clay, nano silica, nano zinc, and glass fibers. When present, the coloring agent can be any standard pigment additive known to modify the color of a resin composition. Exemplary coloring agents include, but are not limited to iron oxide, carbon black, and titanium oxide.

Curing of the present composition can be facilitated through the use of an organometallic compound, UV, electron beam, heat or other peroxide systems known in the art. In preferred embodiments, where a peroxide system is employed, the peroxide system may be a peroxide or hydroperoxide, preferably at concentrations from 0.5 to 4%. Exemplary peroxides or hydroperoxides include, but are not limited to, benzoyl peroxide, lauroyl peroxide, cumene hydroperoxide, t-butyl hydroperoxide, methyl ethyl ketone peroxide (MEKP), t-butyl perbenzoate, and the like. When curing via heat, the present composition may cure at a temperature from 50 to 350° C. depending on the initiator used. When cured, the present composition may exhibit one or more characteristics that are particularly notable for the uses described herein. As a first illustrative example, when cured, the present composition may exhibit a heat deflection temperature greater than 140° F.; alternatively, greater than 160° F.; or alternatively, greater than 180° F. As a second illustrative example, when cured, the present composition may elongate greater than 5%; alternatively, greater than 6%; or alternatively, greater than 7% determined under the testing methodology set forth in ASTM D638, which is hereby incorporated by reference in its entirety. As one skilled in the art would appreciate, this elongation metric is illustrative of the elasticity of the present composition. As a third illustrative example, when cured, the present composition may be able to withstand greater than 4 pulls; alternatively, greater than 10 pulls; alternatively, greater than 20 pulls; alternatively, greater than 50 pulls; alternatively, greater than 100 pulls; or alternatively, greater than 200 pulls. One skilled in the art would appreciate that a pull metric is a standard value to determine durability. One experimental protocol to determine the number of pulls is disclosed in Example 1 herein. In preferred embodiments, when cured, the present composition exhibits a combination of the heat deflection, durability, and elasticity properties described herein. One skilled in the art would find it surprising that the present composition exhibits a combination of these characteristics. For example, it is difficult in the art to design a composition that is both durable and elastic.

The present composition described heretofore can be combined with a pre-gel and/or promotion package to form an adhesive composition particularly suitable to be sprayed onto an object and form a sealant resistant to temperature and pressure changes associated with autoclaving under vacuum.

The pre-gel may comprise styrene, a clay composition, and one or more additives. The styrene of the pre-gel may comprise about 10 to about 40%; alternatively, 10 to 40%; alternatively, 15 to 35%; alternatively, 15 to 30%; alternatively, 15 to 25%; or alternatively, 20 to 25% weight of the total composition. The one or more additives may comprise one or more of the additives described herein. The clay composition of the pre-gel comprises a composition where clay is present. One skilled in the art would appreciate the types of clay compositions that would be suitable for use in the applications described herein. For example, the clay composition may comprise nano-clay, an example of which is available from Neutrino Corporation (Tehran, Iran) under the trade name Cloisite® 10A.

As an illustrative method of making this composition, styrene and methyl methacrylate are added together and heated to approximately 80° F. A clay composition is then slowly and incrementally added to the mixture and subjected to high shear mixing. When no or minimal agglomeration is present, the mixture is ready for further processing. The mixture is then combined with styrene and the present composition and subjected to high shear mixing for 10 minutes. If one or more additives are being employed as a chemical curing agent, such as cobalt octoate or cobalt hydroxide, the chemical curing agent may be added to the mixture and subjected to another 10 minutes of high shear mixing. Finally, and optionally, one or more additives are added to the mixture and subjected to high shear mixing for 10 minutes total or per additive depending on the additive introduced.

In embodiments where the present composition is combined with a pre-gel and/or promotion package, the total composition may have one or more of the following characteristics: gel time of approximately 75 min.; viscosity of 75-100 cps at 25° C.; and/or a non-volatile material percentage ranging from 20-40%; preferably, 30-40%; or optimally 30-35%.

The present composition may also be combined with one or more additional resins. An illustrative example of an additional resin is an unsaturated polyester resin. The unsaturated polyester resin can be any resin which is prepared by the polyesterification of a polyol with a polycarboxylic acid, at least a portion of which contains ethylenic unsaturation. Typical useful unsaturated polyester resins contain as the polyol any of the low molecular weight glycols such as ethylene glycol, propylene glycol, diethylene glycol, dipropylene glycol, polyethylene glycol, polypropylene glycol, butylene glycol, neopentyl glycol and the like; and contain maleic acid, maleic anhydride or fumaric acid or possibly other unsaturated dicarboxylic acids such as itaconic acid, citraconic acid; and may contain quantities of other dicarboxylic acids or polycarboxylic acids which do not contain ethylenic unsaturation such as phthalic acid, phthalic anhydride, isophthalic acid, terephthalic acid, adipic acid, azelaic acid, and the like. Polyesters also may be modified by the addition of cyclopentadiene or dicyclopentadiene, for example. Addition of the one or more additional resins to the present composition should not impact the ability of the composition to adhere to the substrates identified herein.

The core shell vinyl ester resin, the first part of the present composition, or the present composition of any previously described embodiment may be used in a number of methods readily apparent to those skilled in the art. For example, voids in a substrate can be filled using the core shell vinyl ester resin, the first part of the present composition, or the present composition as an adhesive coating herein described in a number of ways. The substrate may be a raw printed object or an object that has been machined to some degree. As a first illustrative example, hand mixed material (curative and raw material in appropriate ratios properly mixed in a cup or bucket) can be applied with squeegee, roller, trowel, spatula, paint stick, paint brush, or any mechanical means that will facilitate fully impressing the coating material into the void. As a second illustrative example, the spray tip can be removed from the spray apparatus without removal of the static mixers. This configuration can then be used to extrude the properly initiated coating material into the voids of the object. Depending upon the size, shape and number of voids present in the surface of the substrate, a combination of the first and second illustrative examples may be used to greatest efficacy, representing substantially a third exemplary method of application. In cases of very large or deep voids, it may be necessary to use a vibratory energy source to ensure that the adhesive coating material fully fills the void(s) in the surface of the substrate without the adhesive coating material containing air voids.

In embodiments, the core shell vinyl ester resin, the first part of the present composition, or the present composition may be applied to the surface of a substrate as an adhesive coating in an additive fashion where the present composition is applied to the surface of the substrate, allowed to cure, and then another layer of the core shell vinyl ester resin, the first part of the present composition, or the present composition is applied to the cured layer of the adhesive coating. This method may be repeated until the desired surface is achieved. This method of application is particularly preferable when large voids are present in the substrate surface. In these embodiments, it is preferable to allow the cured material to reach a temperature within approximately 10° F. of the initial temperature of the surface of the substrate before another layer of the present composition is applied. The application and subsequent curing of the adhesive coating when applied to the surface of a substrate can result in an exothermic reaction. Therefore, a cooling period is necessary to achieve optimal physical characteristics of the adhesive coating. Each layer of the adhesive coating may be applied where the average thickness per layer ranges from 0.025 to 0.25 inches; or alternatively, 0.08 to 0.12 inches. Once the coating is fully cured the object may be smoothed and or shaped as needed in accordance with the standard processing techniques (eliminating sharp edges, etc.).

The average thickness of the adhesive coating on the surface of the substrate may range from 0.05 to 0.50 inches; alternatively, 0.1 to 0.45 inches; alternatively, 0.15 to 0.40 inches; alternatively, 0.20 to 0.40 inches; alternatively, 0.20 to 0.35 inches; alternatively, 0.20 to 0.30 inches; or alternatively; about 0.25 inches; or alternatively, 0.25 inches to achieve the performance noted herein.

In preferred embodiments, the cured adhesive coating is applied to the surface of a substrate (or to another layer of adhesive coating as the case may be), wherein the cured adhesive coating shows no or minimal evidence of thermal dimensional changes. One skilled in the art would readily appreciate what no or minimal evidence of thermal dimensional changes represents. For example, no or minimal evidence of thermal dimensional changes means the human eye cannot identify any peaks or valleys present in the cured adhesive coating. As another example, no or minimal evidence of thermal dimensional changes represents a finished surface profile of less than 0.10 mm, less than 0.05 mm; alternatively, less than 0.04 mm; or alternatively, less than 0.03 mm.

Although the adhesive composition exhibits self-leveling properties, which in turn avoid the need for significant post-curing processing, the adhesive coating can be finished using the conventional means of painting, sanding, and/or buffing. When finished, the surface of the object exhibits no or minimal evidence of thermal dimensional changes as defined herein.

In methods of application where the present composition is being employed as a sealer, particularly in combination with a pre-gel and/or promotion package, the present composition may be sprayed onto the substrate in a single or a series of applications to achieve a layer in the range of 0.004 to 0.01 inches, preferably 0.006 to 0.008 inches. After each application the coating is allowed to cure for one hour at room temperature and then is post-cured at 120° C. for another hour. When the present composition is being used as a sealer, the present composition is particularly suitable to withstand thermal cycling.

The present composition may be used in a method of manufacturing a mold or prototype comprising (a) forming a substrate comprising a polymer body having a surface; (b)

applying an adhesive coating on the surface of the polymer body, wherein the adhesive coating comprising a core shell vinyl ester resin; and (c) curing the adhesive coating. The method may further comprise (d) cooling the cured adhesive coating to within 10° F. of the initial temperature of the substrate; (e) applying the adhesive coating; and (f) curing the adhesive coating applied in step (e). Steps (d) through (e) can be repeated as needed until the desired thickness of the adhesive coating or sealer is achieved. In preferred embodiments, each application of the adhesive to the substrate results in an average thickness of the adhesive coating greater than 0.08 inches. The adhesive coating may further comprise urethane acrylate. The adhesive coating may also comprise any embodiment of the present composition described herein. After the adhesive coating is applied and subsequently cured, the surface profile of the adhesive coating is less than the original surface profile of the surface of the substrate. In embodiments, the forming step (a) is a method of additive manufacturing, preferably methods of large-scale additive manufacturing.

The method of manufacturing a mold or prototype may further comprise applying paint or another sealant to the adhesive coating.

Figure 1:
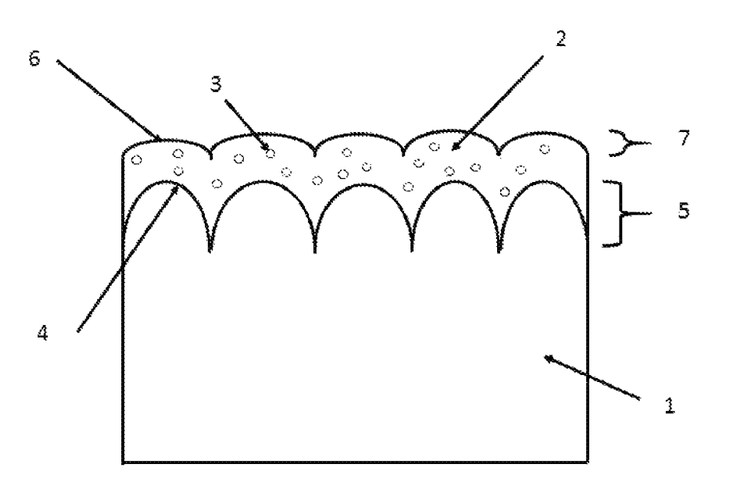
FIG. 1 illustrates the present composition applied to a surface of a substrate as an adhesive coating or sealant in a manner as disclosed herein to form a finished object.

Turning now to the FIGURE where one embodiment of the present composition is applied to a substrate in a manner described herein to form an object, particularly an article of manufacture. Although the FIGURE discloses one embodiment of the present composition applied to a substrate to form an object, one of ordinary skill in the art would appreciate that the teachings of the instant disclosure would not be limited to these embodiments.

FIG. 1 shows a schematic diagram, in cross section, of a polymer substrate 1, a surface of which has been covered by the present composition to form an adhesive coating 2. Coating 2 further contains core shell particles 3. The substrate 1 has an as-fabricated surface 4 with a characteristic surface profile 5. Because coating 2 has a degree of self-leveling, the outer surface 6 of the coating has a surface profile 7 that is substantially less than the surface profile 5 of substrate 1, as described in greater detail herein. It will be appreciated that coating 2 may be applied in more than one coat and it will be further appreciated that in general the surface profile of subsequent coats will be progressively less (i.e., the surface becomes smoother as more coats are applied).

While specific embodiments have been described in detail, it will be appreciated by those skilled in the art that various modifications and alternatives to those details could be developed in light of the overall teachings of the disclosure. In particular, the present composition described herein may be used in any number of different ways and in different applications not necessarily involving objects made by additive manufacturing. Accordingly, the disclosure herein is meant to be illustrative only and not limiting as to its scope and should be given the full breadth of the appended claims and any equivalents thereof.

EXAMPLES

Example 1. Durability

The durability of the present composition was tested through evaluation of the number of pulls an adhesive coating was able to withstand before the coating failed. The results of this analysis are presented in Table 3. Comparator A is a commercially available product from Valvoline (Lexington, KY) sold under the trade name PiioGrip® Plastic Repair 3. Comparator B is a commercially available product from Valvoline (Lexington, KY) sold under the trade name PlioGrip® Finishing Cream. Comparator C is a commercially available product from Valvoline (Lexington, KY) sold under the trade name PlioGrip® Panel 60. Comparator D is a commercially available product from Clausen (Fords, NJ) sold under the trade name Z-Glas Comparator E is a commercially available product from 3M (St. Paul, MN) sold under the trade name EZ sand Flexible Parts Repair Adhesive. Comparator F is a commercially available product from 3M (St. Paul, MN) sold under the trade name Dent Filling Compound Body Filler. In this test, each adhesive coating was applied to carbon fiber filled ABS and failure of its adhesive or cohesive properties was evaluated.

TABLE 3

| | Comp. A | Comp. B | Comp. C | Comp. D | Comp. E | Comp. F | Present Composition |
|---|---|---|---|---|---|---|---|
| # Pulls | 4 | 4 | 1 | 4 | 4 | 3 | >60 |

The foregoing results show that the present composition is significantly more durable than commercially available substitutes.

Example 2. Adhesion

The adhesion of the present composition was tested per ASTM D4541, which is hereby incorporated by reference in its entirety. In short, the adhesive composition is applied to the back side of a dolly, which is then placed on a substrate for testing. After the appropriate cure conditions as set forth in each product's datasheet, a holesaw or cutter was used to cut around the dolly through the coating to or just into the substrate. Then manual pressure was exerted through the use of a PosiTest Pull-Off Adhesion Tester, commercially available from DeFelsko (Ogdensburg, NY). The pressure that resulted in the failure of the adhesive composition is shown in Table 4. The silicone adhesive used in this example is commercially available from Devco (Tulsa, OK) sold under the trade name S120. Embodiment A and Embodiment B noted in Table 4 only differ in viscosity due to the use of a different monomer in the composition.

TABLE 4

| | Silicone Adhesive | Core Shell Vinyl Ester Resin Only | Embodiment A of Present Composition | Embodiment B of Present Composition |
|---|---|---|---|---|
| psi | 277 | 229 | 1313 | 1104 |

The foregoing results show that both embodiments of the present composition adhere to the substrate significantly better than commercially available silicon adhesive. Furthermore, the foregoing results show that the present composition adheres to the substrate significantly better than a composition only containing a core shell vinyl ester resin. From these results, it is shown that the components act in a synergistic and surprising effect to achieve the reported adhesion properties.

Example 3. Elasticity

The elasticity of the present composition was tested per ASTM D638, which is hereby incorporated by reference in its entirety. In short, the cured adhesive composition is placed between a fixed member and a moveable member secured by grips. The moveable member is then moved away from the fixed member in a controlled manner exerting an elastic strain on the present composition. The test measured the maximum elongation, which is shown in Table 5.

TABLE 5

| Core Shell Vinyl Ester Resin Only | Present Composition |
|---|---|
| 5% | Greater than or equal to 8% |

The foregoing results show that the present composition is more elastic than one aspect of the present composition. One skilled in the art would readily appreciate that the present composition is surprisingly elastic given the other physical properties described herein, particularly the adhesion and durability properties described in Examples 1 and 2.

EMBODIMENTS

The preceding description describes, illustrates and exemplifies one or more particular embodiments of an adhesive composition. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the instant disclosure is intended to cover all such embodiments that may fall within the scope of the appended claims, either literally or under the doctrine of equivalents. The present disclosure notes that various embodiments are disclosed herein, at least including:

A. A composition comprising a core shell vinyl ester and a urethane acrylate.
- A.1. The composition of A, wherein the core shell vinyl ester comprises a vinyl ester resin and one or more core shell polymers.
- A.2. The composition of any preceding embodiment, wherein the core shell vinyl ester resin comprises 25 to 95%; preferably, 50 to 95%; more preferably, 60 to 95%; or optimally 75 to 95% of the total weight of present composition.
- A.3. The composition of any preceding embodiment, wherein the urethane acrylate comprises 2 to 25%; preferably 5 to 20% of the total weight of the present composition.
- A.4. The composition of any preceding embodiment, further comprising a monomer.
  - A.4.a. The composition of A.4, wherein the monomer comprises 0.1 to 40%; preferably 0.1 to 30%; and more preferably 0.1 to 20% of the total weight of the present composition.
- A.5. The composition of any preceding embodiment, further comprising one or more additives.
  - A.5.a. The composition of A.5., wherein the one or more additives comprise 0.1 to 40%; preferably, 0.1 to 20%; and more preferably, 0.1 to 15% of the total weight of the present composition.

B. A composition comprising a first part comprising a core shell vinyl ester and a second part comprising a urethane acrylate.
- B.1. The composition of B, wherein the first part comprises 25 to 95%; preferably, 30 to 95%; more preferably, 50 to 90%; and optimally, 65 to 75% of the total weight of the present composition.
  - B.1.a. The composition of B or B.1., wherein the core shell vinyl ester comprises 60 to 95%; preferably, 65 to 95%; more preferably, 70 to 95%; and optimally, 75 to 95% of the total weight of the first part.
  - B1.b. The composition of B or B.1.a., wherein the first part further comprises a monomer and/or one or more additives.
    - B.1.b.i. The composition of B.1.b., wherein the monomer comprises 10 to 80%; preferably, 10 to 70%; and more preferably, 20 to 40%; and optimally, 25 to 35% of the total weight of the first part.
- B.2. The composition of B or B.1., wherein the second part comprises 2 to 25%; preferably, 5 to 20%; more preferably, 5 to 15%; and optimally, 10 to 15% of the total weight of the present composition.
  - B.2.a. The composition of B.2, wherein the urethane acrylate comprises 40 to 90%; preferably, 50 to 90%; more preferably, 60 to 90%; and optimally, 70 to 90% of the total weight of the second part.
  - B.2.b. The composition of B.2 or B.2.a., wherein the second part further comprises a monomer and/or one or more additives.
    - B.2.b.i. The composition of B.2.b., wherein the one or more additives facilitate curing the composition and/or cross-linking the components of the composition.
- B.3. The composition of any one embodiment B-B.2.b.i., further comprising a third part comprising a monomer.
  - B.3.a. The composition of B.3., wherein the third part comprises 1 to 75%; preferably, 2 to 40%; more preferably, 2 to 40%; still more preferably, 10 to 30%; and optimally, 10 to 20% of the total weight of the present composition.

The composition of any preceding embodiment, wherein the core shell vinyl ester comprises 45 to 95%, 50 to 95%, 50 to 90%, 55 to 85%, 60 to 80%, 65 to 75%, or 70 to 75% of the total weight of the composition.

B.4. The composition of any preceding embodiment, wherein the urethane acrylate comprises 5 to 25%, 5 to 20%, 5 to 15%, or 10 to 15% of the total weight of the composition.

B.5. The composition of any preceding embodiment, wherein the urethane acrylate comprises 40 to 80%, 50 to 70%, or 60 to 70% of the total weight of the second part.

B.6. The composition of any preceding embodiment, wherein the second part comprises 2 to 25%, 5 to 20%, 5 to 15%, or 10 to 15% of the total weight of the composition.

C.1. The composition of any preceding embodiment, wherein the vinyl ester resin is produced from the diglycidyl ether of bisphenol-A (DGEBA) and methacrylic acid.

C.2. The composition of any preceding embodiment, wherein the vinyl ester resin is produced from a reaction between glycidyl methacrylate with a multi-functional phenol.

C.3. The composition of any preceding embodiment, wherein the core shell polymers are selected from polymerized versions of: butadiene; butadiene and styrene; butadiene, methyl methacrylate and styrene; butadiene, alkyl methacrylate, and alkyl acrylate; butadiene, styrene, alkyl acrylate, alkyl methacrylate and methacrylic acid; butadiene, styrene, alkyl acrylate, alkyl methacrylate, methacrylic acid and low molecular weight polyethylene (as flow modifier); butyl acrylate and methyl methacrylate; alkyl methacrylate, butadiene and styrene; alkyl acrylate, alkyl methacrylate and glycidylmethacrylate; and alkylacrylate and alkylmethacrylate, preferably butadiene.

C.4. The composition of any preceding embodiment, wherein the core shell polymer has an average diameter of 50 to 350 nm, preferably, 100 to 300 nm, more preferably, 150 to 250 nm; and optimally 200 nm.

D.1. The composition of any preceding embodiment, wherein the urethane acrylate is a reaction product of a diisocyanate, a —OH functional molecule with an olefinic double bond, and an optional mono-, di-, or multifunctional —OH containing material.

D.1.a. The composition of D.1., wherein the diisocyanate is aromatic or aliphatic.

D.1.a.i. The composition of D.1. or D.1.a., wherein the diisocyanate is selected from diphenylmethane diisocyanate (MDI), toluene diisocyanate (TDI), hexamethylene diisocyanate (HDI), isophorone diisocyanate (IPDI), or a combination thereof.

D.2. The composition of any preceding embodiment, wherein the urethane acrylate has an average hydroxy content of 100 to 115.

D.3. The composition of any preceding embodiment, wherein the urethane acrylate has a carbamate linkage content of 0.1 to 10%; preferably, 0.5 to 5%; more preferably, 0.5 to 4%; and optimally 0.5 to 3%.

D.4. The composition of any preceding embodiment, wherein the urethane acrylate has a molecular weight of 600 to 5000, preferably 1500 to 3000.

D.5. The composition of any preceding embodiment, wherein the urethane acrylate has a viscosity of 4000 cps at 60° C.

D.6. The composition of any preceding embodiment, wherein the urethane acrylate comprises two or more attributes of embodiments D.2. through D.5.

D.7. The composition of any preceding embodiment, wherein the urethane acrylate comprises three or more attributes of embodiments D.2. through D.5.

E.1. The composition of any preceding embodiment, wherein the monomer is selected from styrene, methyl methacrylate, vinyl toluene, hydroxy methyl methacrylate, hydroxy methyl acrylate, hydroxy ethyl methacrylate, hydroxy ethyl acrylate, hydroxy propyl acrylate, hydroxy propyl methacrylate, alpha methyl styrene, and divinyl benzene. Further exemplary monomers include o-methyl styrene, m-methyl styrene, p-methyl styrene, methyl acrylate, t-butylstyrene, diallyl phthalate, triallyl cyanurate, trimethylolpropane triacrylate, trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol dimeacrylate; butanediol diacrylate; butane-diol dimethacrylate; pentaerythlitol triacrylate; pentaerythritol tetra-acrylate; ethoxylated bisphenol A diacrylate; hexane diol diacrylate; dipentaerythritol monohydroxypentaacrylate; neopentyl glycol diacrylate; neopentyl glycol dimethacrylate; and tris (2-hydroxyethyl)isocyanurate triacrylate; preferably styrene.

E.2. The composition of any preceding embodiment, wherein the composition further comprises a pre-gel.

E.2.a. The composition of 1.1, wherein the pre-gel comprises 10 to 40%; preferably, 15 to 35%; more preferably, 15 to 30%; still more preferably, 15 to 25%, and optimally 20 to 25% weight of the total composition.

E.2.b. The composition of 1.1 or 1.1.a, wherein the pre-gel comprises styrene, a clay composition, and one or more additives.

F.1. The composition of any preceding embodiment, wherein the one or more additives are selected from an air release/wetting agent, rheology modifier, thixotropic synergist, inhibitor, initiator, catalyst, surfactant, filler, and paraffin wax.

F.1.a. The composition of F.1., wherein the inhibitor is selected from t-butyl catechol, hydroquinone, methyl hydroquinone, monomethyl ether of hydroquinone, copper naphthenate, and triphenyl antimony; or a combination thereof.

F.1.b. The composition of F.1., wherein the catalyst is selected from cobalt naphthenate, cobalt octoate, cobalt hydroxide, potassium octoate, potassium naphthanate, a manganese salt, an iron salt, N,N-dimethylaniline, and N,N-dimethyl-p-toluidine; or a combination thereof.

F.1.c. The composition of F.1., wherein the rheology modifier is selected from fumed silica, clay, organo-treated clay, castor oil, and a polyamide; or a combination thereof.

F.1.d. The composition of F.1., wherein the air release/wetting agent is selected from polyacrylate, silicone, and mineral oil; or a combination thereof.

F.1.e. The composition of F.1., wherein the coloring agent is selected from iron oxide, carbon black, and titanium oxide; or a combination thereof.

F.1.g. The composition of F.1., wherein the filler comprises an organic or inorganic filler.

F.1.g.i. The composition of F.1.g, wherein the organic filler is selected from polyethylene, a crosslinked polyester, a crosslinked acrylic, a crosslinked urethane, abs, graphite, and carbon fibers; or a combination thereof.

F.1.g.ii. The composition of F.1.g., wherein the inorganic filler is selected from calcium carbonate, clay, talc, wollastonite, fly ash, glass microballoons, zinc sulfate, nano clay, nano silica, nano zinc, and glass fibers; or a combination thereof.

G.1. The composition of any preceding embodiment, where the composition further comprises one or more additional resins.

G.1.a. The composition of G.1, wherein the one or more additional resins is one or more unsaturated polyester resins.

G.1.a.i. The composition of G.1.a., wherein the unsaturated polyester resin is prepared by the polyesterification of a polyol with a polycarboxylic acid.

G.1.a.ii. The composition of G.1.a. or G.1.a.i., wherein the unsaturated polyester resin comprises ethylene glycol, propylene glycol, diethylene glycol, dipropylene glycol, polyethylene glycol, polypropylene glycol, butylene glycol, or neopentyl glycol.

G.1.a.iii. The composition of any one embodiment G.1.a. to G.1.a.ii, wherein the unsaturated polyester resin is selected from maleic acid, maleic anhydride, fumaric acid, itaconic acid, citraconic acid, phthalic acid, phthalic anhydride, isophthalic acid, terephthalic acid, adipic acid, and azelaic acid.

G.1.a.iv. The composition of any one embodiment G.1.a. to G.1.a.iii, wherein at least a portion of the unsaturated polyester resin contains ethylenic unsaturation.

G.1.a.v. The composition of any one embodiment G.1.a. to G.1.a.iv, wherein the unsaturated polyester resin has been modified by cyclopentadiene or dicyclopentadiene.

H.1. The composition of any preceding embodiment, wherein when the composition is cured, the composition exhibits a heat deflection temperature greater than 140° F., preferably greater than 160° F.; and more preferably, greater than 180° F.

H.2. The composition of any preceding embodiment, wherein the composition can elongate greater than 5%, preferably greater than 6%; more preferably, greater than 8%.

H.2.a. The composition of H.2., wherein the elongation is determined in accordance with ASTM D638.

H.3. The composition of any preceding embodiment, wherein the present composition may be able to withstand greater than 4 pulls; preferably, greater than 10 pulls; more preferably, greater than 20 pulls; still more preferably, greater than 50 pulls; yet still more preferably, greater than 100 pulls; and optimally, greater than 200 pulls.

H.4. The composition of any preceding embodiment, wherein the composition is cured through the use of an organometallic compound, UV, electron beam, heat or other peroxide systems.

I. An object comprising a polymer body having a surface; and an adhesive coating on the surface of the polymer body, wherein the adhesive coating comprises core shell vinyl ester resin.

I1. The object of I, wherein the adhesive coating further comprises a urethane acrylate.

I2. The object of I or I1, wherein the core shell vinyl ester resin, the first part of any preceding embodiment, or the composition of any preceding embodiment has an average thickness of greater than 0.08 inches.

I3. The object of any one embodiment I to I2, wherein the adhesive coating has an average thickness per layer of 0.025 to 0.25 inches, preferably 0.08 to 0.12 inches.

I4. The object of any one embodiment 1 to I3, wherein the average thickness of the adhesive coating on the surface of the substrate is 0.05 to 0.50 inches; preferably, 0.1 to 0.45 inches; more preferably, 0.15 to 0.40 inches; still more preferably, 0.20 to 0.40 inches; yet still more preferably, 0.20 to 0.35 inches; and optimally, 0.20 to 0.30 inches.

I5. The object of any one embodiment I to I4, wherein the object is impervious or substantially impervious to gas or liquid when the adhesive coating is applied to the surface of the polymer body and allowed to cure.

I6. The object of any one embodiment I to I5, wherein the adhesive coating inhibits the entry of gas or liquid into the substrate.

I7. The object of any one embodiment I to I6, wherein the adhesive coating fills in voids, geometric imperfections, missing or broken beads, under-filled cavities, or surface contours or textures of the substrate.

I8. The object of any one embodiment I to I7, wherein the adhesive coating further comprises one or more cross-linking agents, curing agents, thixotropic agents, air release/wetting agents, coloring agents, inorganic fillers, organic fillers, light weight fillers, surfactants, inorganic nanoparticles, organic nanoparticles, and combinations thereof.

I9. The object of any one embodiment I to I8, wherein the substrate comprises acrylonitrile butadiene styrene, polyphenylene sulfide, polypenylsulfone, polyethersulfone, polyethylene terephthalate, polybutylene terephthalate, polylactic acid, or combinations thereof.

I10. The object of any one embodiment I to I9, wherein the substrate is reinforced with glass fibers, carbon fibers, bamboo, or combinations thereof.

I11. The object of any one embodiment 1 to I10, wherein the adhesive composition adheres to the surface of the polymer body and forms a bond between the adhesive coating and substrate, wherein the bond strength between the coating and the substrate is greater than 300 psi.

I12. The object of any one embodiment I to I11, wherein the surface of the polymer body has a first surface profile, and the surface of the coating after curing has a second surface profile less than the first surface profile.

I13. The object of any one embodiment I to I12, wherein the substrate has a surface profile of 1.0 to 10 mm; preferably, 2 to 7.5 mm, and more preferably, 2.5 to 5.0 mm prior to addition of the composition.

I14. The object of any one embodiment I to I13, wherein the adhesive coating, when cured on the surface of the polymer body, has a finished surface profile of less than 0.1 mm; preferably, less than 0.08 mm; more preferably, less than 0.05 mm; still more preferably, less than 0.04 mm; and optimally, less than 0.03 mm.

I15. The object of any one embodiment I to I14, wherein the object is a polymer composite article.

I16. The object of any one embodiment I to I15, wherein the object or polymer composite article is generated via an additive manufacturing method.

I17. The object of any one embodiment I to I16, wherein the object or polymer composite article is produced via large-scale additive manufacturing method.

I18. The object of any one embodiment I to I17, wherein the adhesive coating comprises a composition of any one embodiment A to H4.

J. A method of manufacturing an object comprising:
(a) forming a substrate comprising a polymer body having a surface;
(b) applying an adhesive coating on the surface of the polymer body, wherein the adhesive coating comprising core shell vinyl ester resin;
(c) curing the adhesive coating applied in (b).

J1. The method of J, wherein the adhesive coating further comprises urethane acrylate.

J2. The method of J or J1, wherein the applying step comprises applying the composition with a squeegee, roller, trowel, spatula, paint stick, paint brush, or other mechanical means.

J3. The method of any one embodiment J to J2, wherein the applying step comprises spraying the adhesive coating onto the surface of the polymer body.

J3.a. The method of J3, wherein the adhesive coating forms a layer with a thickness of 0.004 to 0.01 inches, preferably 0.006 to 0.005 inches.

J3.b. The method of J3 of J3.a., wherein the adhesive composition further comprises a pre-gel and/or promotion package as defined by any one embodiment of E2 to E2.b.

J4. The method of any one embodiment J to J3.b, wherein the adhesive coating is applied and allowed to cure and then another layer of the adhesive coating is applied to the cured layer.

J5. The method of any one embodiment J to J4, wherein the applying step comprises applying the composition to achieve a layer of the composition with a thickness of greater than 0.08 inches.

J6. The method of any one embodiment J to J5, wherein curing is performed using UV light, an electron beam, an organometallic compound, a peroxide, or heat.

J7. The method of any one embodiment J to J6, wherein curing is performed by heating the substrate at a temperature of 50 to 350° C.

J8. The method of any one embodiment J to J7, wherein when the adhesive coating is cured, the adhesive coating exhibits a heat deflection temperature of greater than 140° F.; preferably, greater than 160° F.; and more preferably, greater than 180° F.

J9. The method of any one embodiment J to J8, wherein the method further comprises:
(d) cooling the cured adhesive coating to within 10° F. of the initial temperature of the surface of the substrate;
(e) applying an additional layer of the adhesive coating; and
(f) curing the at least one layer of adhesive coating applied in step (e) and, optionally
(g) repeating steps (d) to (f) until the desired average thickness of the adhesive coating is achieved.

J10. The method of any one embodiment J to J9, wherein the object is a polymer composite article.

J11. The method of any one embodiment J to J10, wherein the object or polymer composite article is generated via an additive manufacturing method.

J12. The object of any one embodiment J to J11, wherein the object or polymer composite article is produced via large-scale additive manufacturing method.

J13. The method of any one embodiment J to J12, wherein the object or polymer composite article is a mold or prototype.

J14. The method of any one embodiment J to J13, wherein the adhesive coating comprises a composition of any one embodiment A to H4.

What is claimed is:

1. A polymer composite article comprising:
   a substrate comprising a polymer body having a surface with a surface profile in the range of 1.0 to 10 mm; and,
   an adhesive coating on the surface of the polymer body, wherein the adhesive coating comprises core shell vinyl ester resin, wherein the adhesive coating has a surface profile of less than 0.10 mm after applying the adhesive coating.

2. The polymer composite article of claim 1, wherein the adhesive coating further comprises a urethane acrylate and, optionally one or more additives.

3. The polymer composite article of claim 1, wherein the adhesive coating, when cured, has an average thickness of greater than 0.08 inches.

4. The polymer composite article of claim 1, wherein the substrate comprises acrylonitrile butadiene styrene, polyphenylene sulfide, polyphenylsulfone, polyethersulfone, polyethylene terephthalate, polybutylene terephthalate, polylactic acid, or combinations thereof, each of which may be optionally reinforced with glass fibers, carbon fibers, bamboo, or combinations thereof.

5. The polymer composite article of claim 1, wherein bond strength between the surface of the substrate and the adhesive coating after the adhesive coating is cured is at least 300 psi.

6. A method of manufacturing a polymer composite article comprising:
   (a) forming a substrate comprising a polymer body having a surface with a surface profile in the range of 1.0 to 10 mm;
   (b) applying an adhesive coating on the surface of the polymer body, wherein the adhesive coating comprises core shell vinyl ester resin;
   (c) curing the adhesive coating, wherein the adhesive coating has a surface profile of less than 0.10 mm after applying the adhesive coating.

7. The method of manufacturing a polymer composite article of claim 6, wherein the adhesive coating further comprises a urethane acrylate and, optionally one or more additives.

8. The method of manufacturing a polymer composite article of claim 6, wherein the substrate comprises acrylonitrile butadiene styrene, polyphenylene sulfide, polyphenylsulfone, polyethersulfone, polyethylene terephthalate, polybutylene terephthalate, polylactic acid, or combinations thereof, each of which may be optionally reinforced with glass fibers, carbon fibers, bamboo, or combinations thereof.

9. The method of manufacturing a polymer composite article of claim 6, wherein the applying step comprises applying the adhesive coating to achieve a layer with a thickness of greater than 0.08 inches.

10. The method of manufacturing a polymer composite article of claim 6, further comprising:
    (d) cooling the cured adhesive coating to within 10° F. of the initial temperature of the surface of the substrate;
    (e) applying an additional layer of the adhesive coating;
    (f) curing the adhesive coating applied in step (e); and optionally,
    (g) repeating steps (d)-(f) until the desired average thickness of the adhesive coating is achieved.

11. The method of manufacturing a polymer composite article of claim 6, wherein the adhesive coating is applied by spraying the adhesive coating onto the surface of the polymer body, or by applying the composition with a squeegee, roller, trowel, spatula, paint stick, or paint brush.

* * * * *

UNITED STATES PATENT AND TRADEMARK OFFICE
CERTIFICATE OF CORRECTION

| | |
|---|---|
| PATENT NO. | : 11,883,842 B2 |
| APPLICATION NO. | : 15/488251 |
| DATED | : January 30, 2024 |
| INVENTOR(S) | : Richard Earl Spears et al. |

It is certified that error appears in the above-identified patent and that said Letters Patent is hereby corrected as shown below:

In the Specification

Column 6, Lines 12-13, "tri methylolpropane triacrylate, tri methylolpropane tri methacrylate" should be changed to --trimethylolpropane triacrylate, trimethylolpropane trimethacrylate--.

Column 13, Line 67, "PiioGrip®" should be changed to --PlioGrip®--.

Column 17, Line 64, "composition of 1.1" should be changed to --composition of I.1--.

Column 18, Line 1, "composition of 1.1 or 1.1.a" should be changed to --composition of I.1 or I.1.a--.

Column 19, Line 34, "embodiment 1 to 13" should be changed to --embodiment I to I3--.

Column 19, Line 65, "embodiment 1 to I10" should be changed to --embodiment I to I10--.

Signed and Sealed this
First Day of October, 2024

Katherine Kelly Vidal
*Director of the United States Patent and Trademark Office*